(12) United States Patent
Takeuchi (10) Patent No.: US 8,704,941 B2
(45) Date of Patent: Apr. 22, 2014

(54) FOCUS DETECTING APPARATUS AND CONTROL METHOD THEREOF

(75) Inventor: Kengo Takeuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 13/307,227

(22) Filed: Nov. 30, 2011

(65) Prior Publication Data

US 2012/0154667 A1   Jun. 21, 2012

(30) Foreign Application Priority Data

Dec. 16, 2010   (JP) ................................ 2010-281006

(51) Int. Cl.
*H04N 5/232*   (2006.01)
*G03B 13/00*   (2006.01)

(52) U.S. Cl.
USPC ........................................................... 348/350

(58) Field of Classification Search
USPC .................. 348/335, 345, 349, 350
See application file for complete search history.

(56) References Cited

U.S. PATENT DOCUMENTS

| 5,721,977 | A | 2/1998 | Yamawaki et al. |
| 5,940,634 | A | 8/1999 | Nakamura |
| 7,154,589 | B2* | 12/2006 | Mihara et al. ................ 356/3.13 |
| 8,368,800 | B2* | 2/2013 | Ohnishi ......................... 348/349 |
| 2004/0156033 | A1* | 8/2004 | Kanemitsu .................... 356/3.01 |
| 2005/0036128 | A1* | 2/2005 | Mihara et al. ................ 356/3.14 |
| 2009/0109322 | A1* | 4/2009 | Ohnishi ......................... 348/345 |

FOREIGN PATENT DOCUMENTS

| JP | 2003-098421 |   | 4/2003 |
| JP | 2004-347911 | A | 12/2004 |
| JP | 2005-147959 | A | 6/2005 |
| JP | 2010-170042 | A | 5/2010 |

* cited by examiner

*Primary Examiner* — Nicholas Giles

(74) *Attorney, Agent, or Firm* — Cowan, Liebowitz & Latman, P.C.

(57) ABSTRACT

An external AF focus detecting apparatus capable of achieving both good focus detection accuracy for a subject in a short distance and an appropriate amount of processing for a subject in a long distance is provided. In the case where the distance to the subject is less than a predetermined threshold value, with respect to accumulation pixels SA5 to SA25 selected in one of a pair of line sensors, pixels are selected in the other line sensor so as to include more pixels in the direction of shift of an optical image of a field of view, namely, pixels SB5 to SB29 are selected as accumulation pixels. Alternatively, pixels included in a range obtained by shifting by a predetermined number of pixels from the range of the accumulation pixels that have been selected in the one line sensor are selected as the accumulation pixels in the other line sensor.

6 Claims, 8 Drawing Sheets

LUMINANCES OF SUBJECT IN SHORT DISTANCE

IN THE CASE OF L1

FIG. 6C

IN THE CASE OF L2

FIG. 6D

IN THE CASE OF L3

FIG. 6E

IN THE CASE OF L2

▨ RANGE OF PIXELS SELECTED TO ACQUIRE IMAGE SIGNAL A

FOCUS DETECTING APPARATUS AND CONTROL METHOD THEREOF

BACKGROUND OF THE INVENTION

1. Field of the Invention

The present invention relates to a focus detecting apparatus and a control method thereof, and in particular to a focus detecting apparatus that performs auto focus detection and a control method thereof.

2. Description of the Related Art

Currently, general image capturing apparatuses such as still cameras and video cameras have an auto focus detection (AF) function. As the auto focus detection method, contrast detection method and phase-difference detection method are widely used. With the phase-difference detection method, the distance to a subject (or the amount of defocus) is detected from the phase difference between signals obtained from a pair of line sensors, using the principle of triangulation, and the position of a focusing lens of an image capturing lens is controlled based on the result of the detection, whereby the image capturing lens can focus on the subject.

Two specific configurations for implementing the phase-difference detection method are known: so-called TTL method in which light that has entered an image capturing lens is received by line sensors; and so-called external AF in which light that has entered via a route other than passing through an image capturing lens is received by line sensors. With the former method, the amount of defocus can be detected based on the phase difference between output signals from the line sensors, and with the latter method, the distance to a subject can be detected.

With the external AF method, an optical system that performs focus detection (optical system for focus detection) is provided at a position different from that of an optical system that forms an image of a subject to be captured (optical system for imaging). This causes parallax between the systems, so that the imaging area and the focus detection area do not match. Also, the phase difference between signals obtained from a pair of line sensors of an external AF sensor increases as the distance to the subject becomes shorter and decreases as the distance to the subject becomes longer. Due to the principle of the external AF method, it is necessary to dynamically optimize and select pixels (detection pixel portion) for use in phase difference detection from among a plurality of pixels included in the line sensors according to the distance to the subject. Accordingly, with respect to the external AF method, a method has been proposed in Japanese Patent Laid-Open No. 2003-98421 that determines an optimal focus detection area to use from a plurality of focus detection areas of a line sensor. Japanese Patent Laid-Open No. 2003-98421 discloses a technique in which when the focus detection area is switched based on the focal length (angle of view) of the zoom lens of the camera, a focus detection area to be selected is determined according to the result of focus detection obtained in a focus detection area positioned substantially in the center of an image capturing screen.

As described above, with the external AF method, in the case of a subject in a short distance, because the phase difference between signals obtained from a pair of line sensors is very large, it is necessary to provide more pixels in the individual line sensors in order to achieve highly accurate focus detection on the subject in a short distance. In contrast, in the case of a subject in a long distance, because there is little phase difference between signals, highly accurate focus detection is possible using a smaller number of pixels than in the case where focus detection is performed on a subject in a short distance. Accordingly, if focus detection is performed on a subject in a long distance by using the same number of pixels as that used to perform focus detection on a subject in a short distance, it will lead to over processing, and is therefore not desirable in terms of processing time and power consumption.

SUMMARY OF THE INVENTION

The present invention solves the problems encountered with conventional technology as described above and provides an external AF focus detecting apparatus capable of achieving both good focus detection accuracy for a subject in a short distance and an appropriate amount of processing for a subject in a long distance, and a control method thereof.

According to one aspect of the present invention, there is provided a focus detecting apparatus including an optical system for focus detection arranged such that an optical axis thereof does not overlap with an optical axis of an optical system for imaging, the focus detecting apparatus comprising: a pair of line sensors that includes a plurality of pixels and that is for performing photoelectric conversion on a pair of optical images of a field of view formed by a pair of image-forming lenses of the optical system for focus detection, the image-forming lenses having parallel optical axes; a selection unit that selects, with respect to each of the pair of line sensors, a plurality of pixels for use in the photoelectric conversion of the optical images of a field of view; and a detecting unit that detects a distance to a subject on which focus detection is to be performed, based on a phase difference between signals of the pair of optical images of a field of view that have undergone photoelectric conversion performed by the plurality of pixels selected by the selection unit, wherein in a case where a distance to the subject detected by the detecting unit in a previous time is less than a predetermined threshold value, the selection unit selects, with respect to one of the pair of line sensors, a plurality of pixels that are included in a range in which an image capture area of the optical system for imaging and an image capture area of the optical system for focus detection overlap, and selects, with respect to the other line sensor, a plurality of pixels such that more pixels are included on which the same optical image of a field of view as that formed on the plurality of pixels that have been selected in the one line sensor is formed than in a case where pixels located at positions corresponding to those of the plurality of pixels that have been selected in the one line sensor are selected.

According to another aspect of the present invention, there is provided a control method of a focus detecting apparatus including an optical system for focus detection arranged such that an optical axis thereof does not overlap with an optical axis of an optical system for imaging, the method comprising the steps of: selecting, with respect to each of a pair of line sensors that includes a plurality of pixels and that is for performing photoelectric conversion on a pair of optical images of a field of view formed by a pair of image-forming lenses of the optical system for focus detection, the image-forming lenses having parallel optical axes, a plurality of pixels for use in the photoelectric conversion of the optical images of a field of view; and detecting a distance to a subject on which focus detection is to be performed, based on a phase difference between signals of the pair of optical images of a field of view that have undergone photoelectric conversion performed by the plurality of pixels selected in the selection step, wherein in the selection step, in a case where a distance to the subject detected in the detecting step in a previous time is less than a predetermined threshold value, with respect to one of the pair of line sensors, a plurality of pixels that are included in a range in which an image capture area of the optical system for imaging and an image capture area of the optical system for focus detection overlap are selected, and with respect to the other line sensor, a plurality of pixels are selected such that more pixels are included on which the same optical image of a field of view as that formed on the plurality of pixels that have been selected in the one line sensor is formed than in a case where pixels located at positions corresponding to those of the plurality of pixels that have been selected in the one line sensor are selected.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
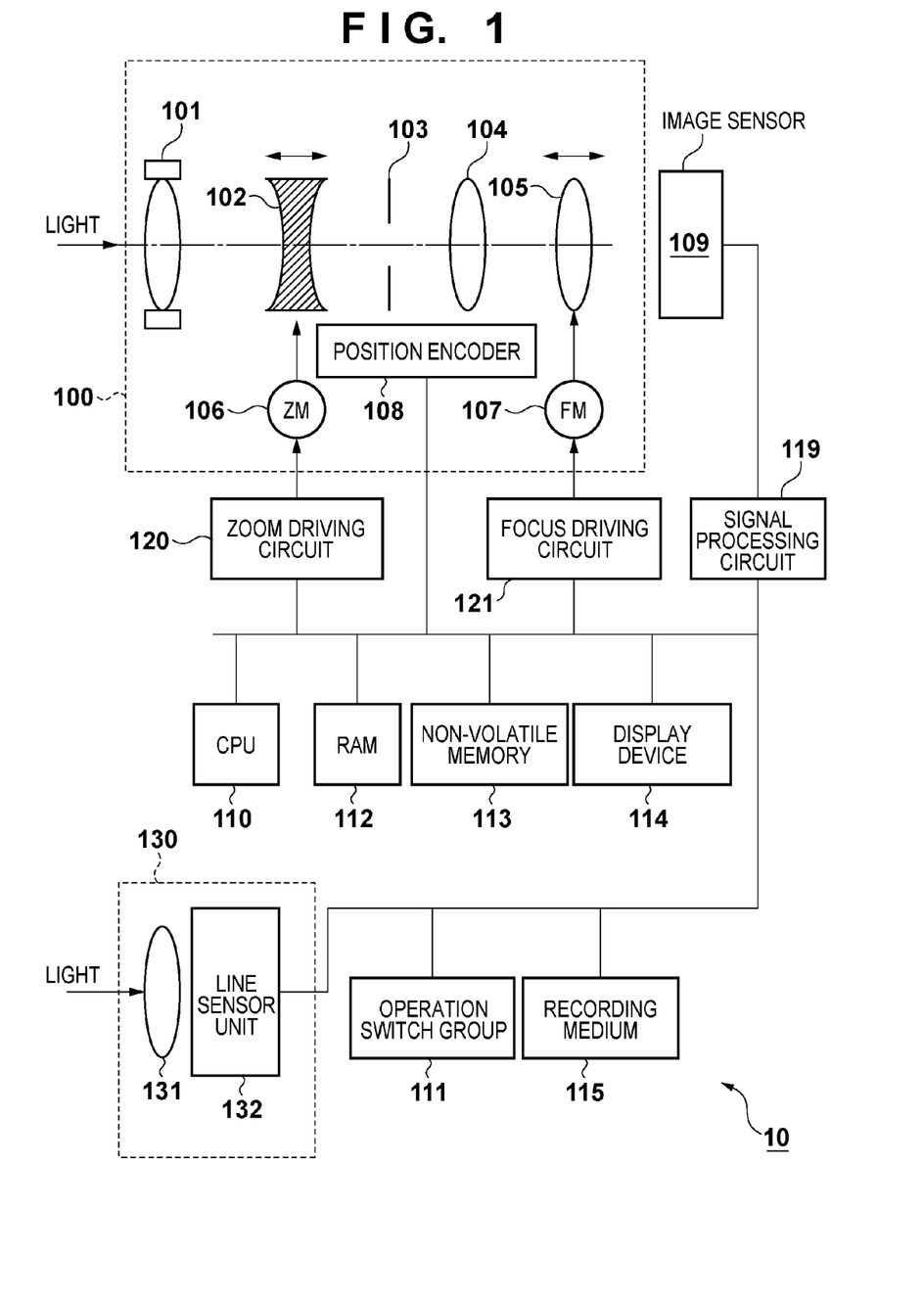
FIG. 1 is a block diagram showing an example of a configuration of a video camera serving as an example of an image capturing apparatus to which a focus detecting apparatus according to an embodiment of the present invention can be applied.

FIG. 1 is a block diagram showing an example of a configuration of a digital video camera 10 serving as an example of an image capturing apparatus to which an external AF focus detecting apparatus according to an embodiment of the present invention is applied.

A lens unit 100 constitutes an optical system for imaging, and a fixed lens 101, a zoom lens 102, an aperture 103, a fixed lens 104 and a focusing lens 105 are arranged in this order from the subject side (the side from which light enters). These individual lenses are illustrated as being composed of a single lens in the diagram, but may be composed of a plurality of lenses.

A position encoder 108 detects the magnification power of the zoom lens 102, the size (aperture value) of the aperture 103 and the position of the focusing lens 105.

The zoom lens 102 is driven in the optical axis direction by a zoom motor (ZM) 106, and the focusing lens 105 is driven in the optical axis direction by a focus motor (FM) 107. The zoom motor 106 and the focus motor 107 are operated in response to driving signals from a zoom driving circuit 120 and a focus driving circuit 121, respectively.

An image sensor 109 can be, for example, a CCD image sensor or CMOS image sensor. The image sensor 109 converts a subject image within an image capture area, formed by light that has entered the lens unit 100, into electrical signals on a pixel-by-pixel basis by using a plurality of photoelectric conversion elements. A signal processing circuit 119 performs various types of processing on the electrical signals output by the image sensor 109, such as A/D conversion processing, amplification processing, white balance processing, color interpolation processing and gamma correction processing, so as to generate image data in a predetermined format. The image data is output to a display device 114 or recorded in a recording medium 115 such as a semiconductor memory, optical disk, or hard disk.

An operation switch group 111 includes a power switch, a switch for starting and stopping a recording operation or reproduction operation, a switch for selecting an operation mode, a zoom switch for changing the zoom magnification power (angle of view) of the lens unit 100 and the like. Upon operation of the power switch, one of programs stored in a non-volatile memory 113 is loaded into a RAM 112, and a CPU 110 executes the program loaded into the RAM 112 and thereby controls the operations of the constituent elements of the video camera. The video camera of the present embodiment is capable of, in addition to external AF, contrast AF with which auto focus detection is performed by searching for a position at which the contrast of image data of a partial image (focus detection area) captured by the image sensor 109 peaks. With the contrast AF, the in-focus position is searched for by the so-called hill-climbing control in which the in-focus peak at which the highest contrast is obtained is searched for by repeatedly executing image capturing and contrast detection from the image data of the focus detection area while gradually moving the focusing lens.

The digital video camera 10 is provided with an external AF sensor unit 130 that includes an optical system for focus detection and that is arranged such that its optical axis does not overlap with the optical axis of the lens unit 100 (optical system for imaging). The external AF sensor unit 130 includes an image-forming lens 131 (optical system for focus detection) including a pair of image-forming lenses whose optical axes are parallel and a line sensor unit 132 including a pair of line sensors. Each of the line sensor includes a plurality of light receiving elements (pixels) that are aligned in a line, which will be described in detail later with reference to FIGS. 2A and 2B. Subject's light enters the line sensor unit 132 via the image-forming lens 131 having a fixed focal length f (in other words, without passing through the lens unit 100 which is an optical system for imaging). A subject's image is subjected to photoelectric conversion in the line sensor unit 132 and thereafter converted to digital data by an A/D converter (not shown). The CPU 110 computes the distance to the subject, the amount of correlation, reliability and the like by using a pair of digital data obtained from a pair of line sensors included in the line sensor unit 132 and a known technique.

Based on the computation results, the CPU 110 provides a position to which the focusing lens 105 is to be moved to the focus driving circuit 121 so as to control the position of the focusing lens 105, whereby external AF is implemented.

An example of a configuration of the external AF sensor unit 130 will be described next with reference to FIGS. 2A and 2B.

Figure 2A:
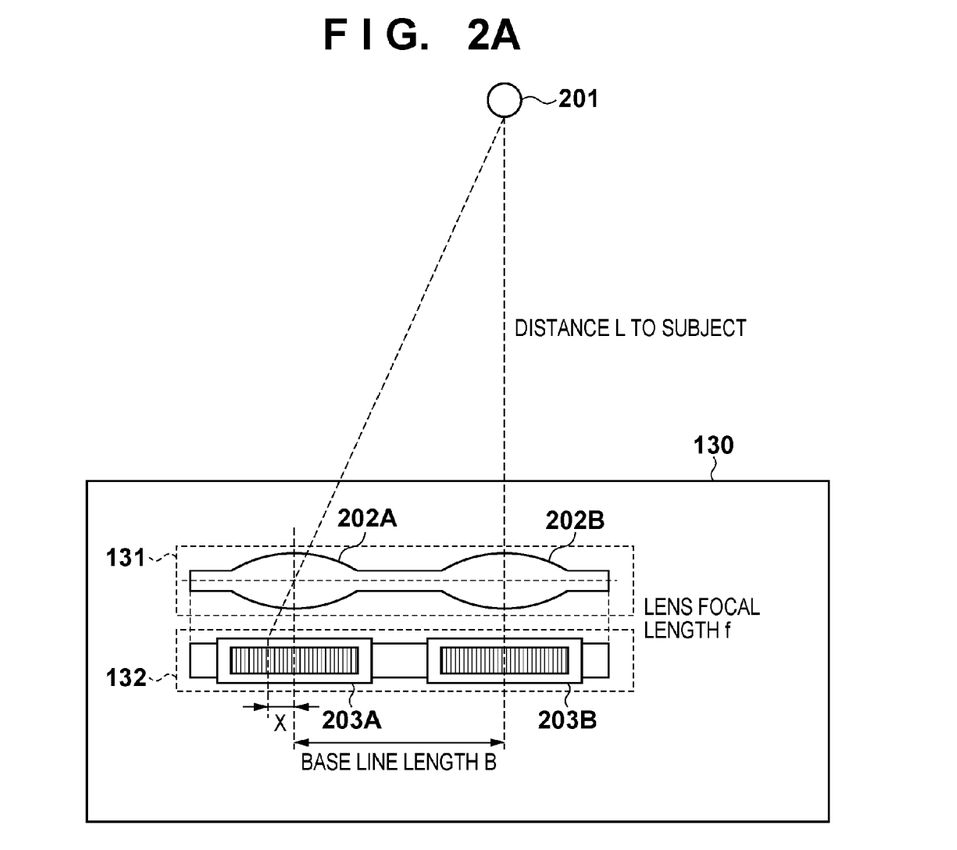
FIGS. 2A and 2B are diagrams showing an example of a configuration of an external AF sensor unit shown in FIG. 1.

In FIG. 2A, a subject 201 is a target for focus detection among the subjects in the range to be captured (field of view). The image-forming lens 131 has a configuration in which first and second image-forming lenses 202A and 202B whose optical axes are parallel are formed as a single unit. The line sensor unit 132 includes first and second line sensors 203A and 203B.

An optical image of the field of view formed by one of the pair of image-forming lenses, namely the first image-forming lens 202A, is detected by the first line sensor 203A, and an optical image of the field of view formed by the other of the pair of the image-forming lenses, namely the second image-forming lens 202B, is detected by the second line sensor 203B. The first and second line sensors 203A and 203B perform photoelectric conversion on respective optical images of the field of view and output electrical signals corresponding to the luminances of the optical images of the field of view. Hereinafter, the electrical signal output by the first line sensor 203A will be referred to as the image signal A, and the electrical signal output by the second line sensor 203B will be referred to as the image signal B.

The first and second image-forming lenses 202A and 202B are spaced apart from each other by a preset base line length B, and the first and second line sensors 203A and 203B are also spaced apart from each other by the same length. Accordingly, a distance L to the subject can be measured based on the principle of triangulation by using the image signals A and B obtained from the first and second line sensors 203A and 203B.

Figure 2B:
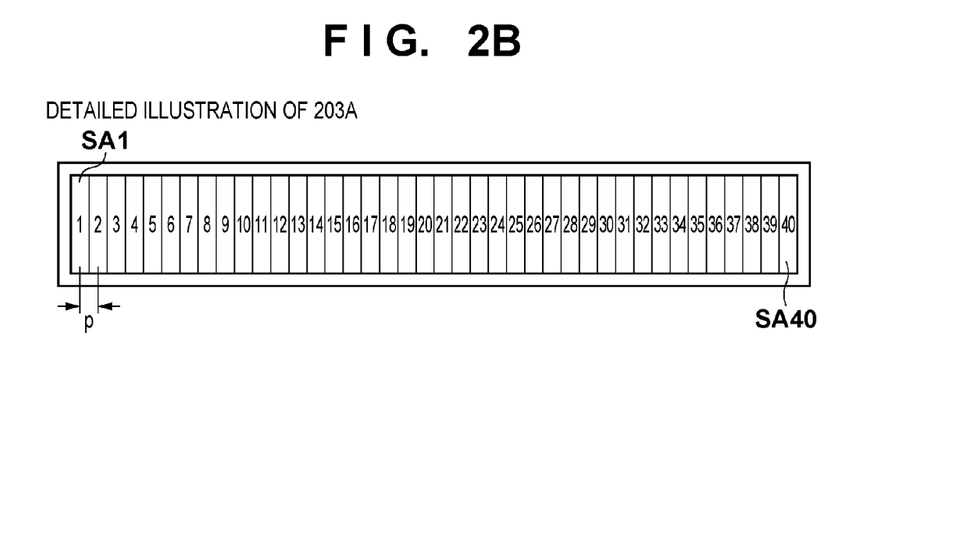

FIG. 2B is a diagram showing the first line sensor 203A in further detail. The first line sensor 203A has a configuration in which 40 rectangular pixels are arranged side by side at a pixel pitch p. The first line sensor 203A also includes a digital circuit (not shown) for controlling charge accumulation and is configured to, if the amount of charge accumulated in one of the pixels reaches a predetermined value, stop the accumulation operation on other pixels. Also, which of the 40 pixels is to be subjected to charge accumulation can be set from the CPU 110. There is no particular limitation on the setting method, and for example, enabling and disabling of a pixel can be controlled by using 40 bit data in which "1" is assigned to enabled pixels and "0" is assigned to disabled pixels and also 40 logic gates using each bit as one input. The second line sensor 203B has the same configuration as that of the first line sensor 203A, and thus a description thereof is omitted here. In the following description, pixels 1 to 40 of the first line sensor 203A will be referred to as pixels SA1 to SA40, and pixels 1 to 40 of the second line sensor 203B will be referred to as pixels SB1 to SB40.

Figure 3A:
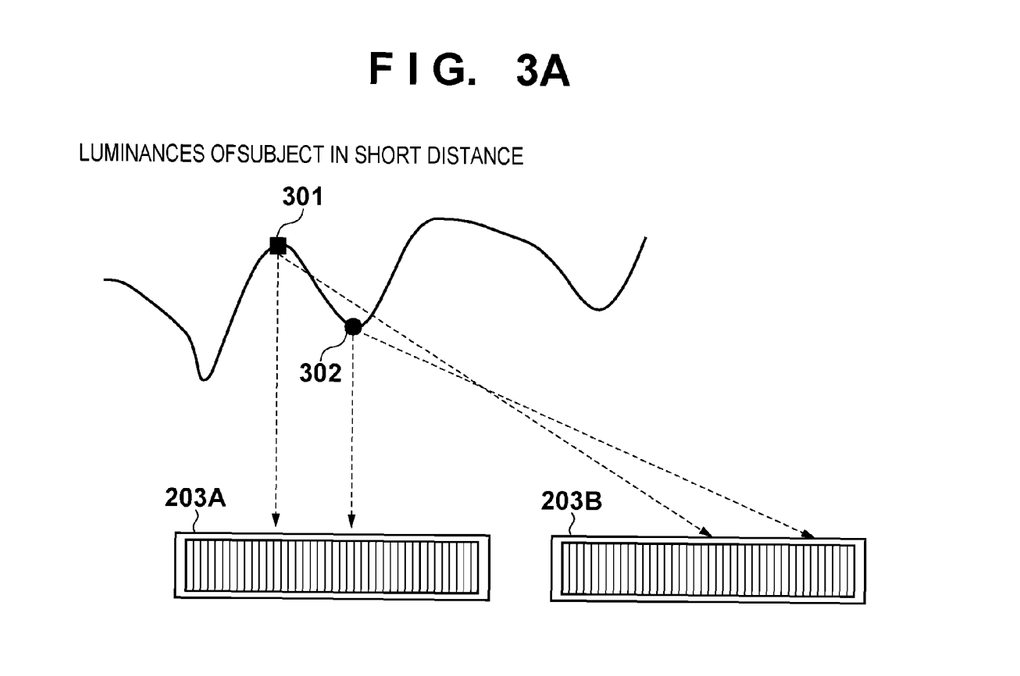
FIGS. 3A and 3B are diagrams illustrating the relationship between the luminance signal of a subject positioned in a short distance and the luminance signal detected by each line sensor of the external AF sensor unit shown in FIGS. 2A and 2B.
Figure 3B:
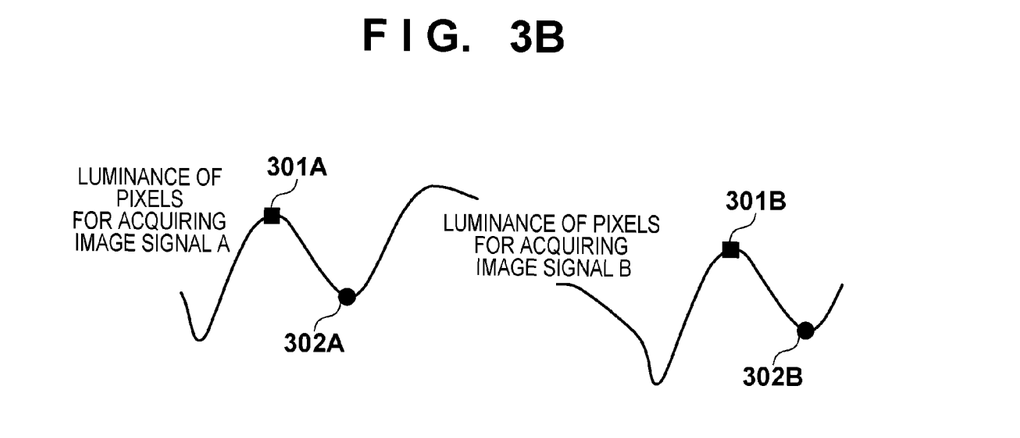

FIG. 3A shows examples of subject's luminances, and FIG. 3B shows examples of the image signals A and B obtained by the external AF sensor unit 130 based on the subject's luminances shown in FIG. 3A. In the example shown in FIGS. 3A and 3B, the distance to the subject is as short as approximately 50 cm, the position of a subject's luminance 301 is detected in pixels SA13 and SB23, the position of a subject's luminance 302 is detected in pixels SA22 and SB32, and the phase difference between the image signals A and B corresponds to 11 pixels. The distance L to the subject can be calculated based on the principle of triangulation by using the phase difference.

In the case where the distance L to the subject is short as shown in the example of FIGS. 3A and 3B, a sufficiently large phase difference between the image signals A and B is detected. However, in the case where the distance L to the subject is long, particularly in the case where the subject is positioned in a distance corresponding to the infinity distance of the lens unit 100, substantially no phase difference between the image signals A and B is detected.

Figure 4:
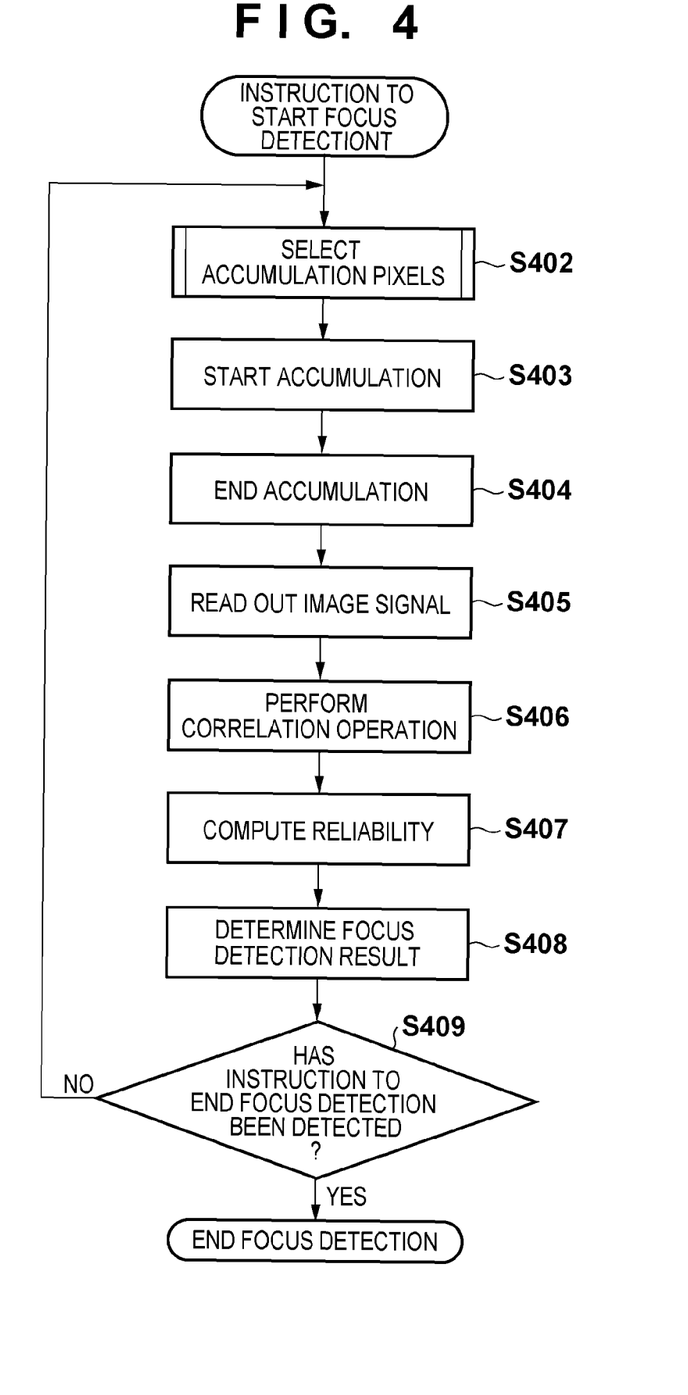
FIG. 4 is a flowchart illustrating a focus detection operation performed by a video camera according to an embodiment of the present invention.

A focus detection operation performed by the external AF sensor unit 130 according to the present embodiment will be described next with reference to the flowchart shown in FIG. 4.

The focus detection operation starts when the digital video camera 10 goes into a preset state such as, for example, when the digital video camera 10 is powered on and goes into a standby state for recording.

In step S402, the CPU 110 selects pixels (accumulation pixels) for use to acquire image signals A and B in the line sensors, and sets the selected pixels in the external AF sensor unit 130. This selection processing will be described later in detail. In this example, it is assumed that pixels SA5 to SA25 of the first line sensor 203A and pixels SB5 to SB25 of the second line sensor 203B are selected by default when the digital video camera 10 is activated.

In step S403, the CPU 110 instructs the external AF sensor unit 130 to start charge accumulation, and charge accumulation starts in the line sensor unit 132. When the amount of charge (voltage) accumulated in any one of the pixels (SA5 to SA25 and SB5 to SB25) selected in step S402 has reached a predetermined value, the charge accumulation operation for all pixels is automatically terminated by a control circuit of the external AF sensor unit 130 (step S404). In this example, the predetermined value is set to a value close to saturation charge amount.

In step S405, the CPU 110 performs A/D conversion on the amount of charge of each pixel accumulated in the line sensor unit 132 so as to obtain image signals A and B corresponding to the subject's luminances. In this example, only the charge accumulated in the pixels SA5 to SA25 of the first line sensor 203A and that in the pixels SB5 to SB25 of the second line sensor 203B are read out. Accordingly, the image signals A and B each are constituted by the amount of charge accumulated in 21 pixels.

In step S406, the CPU 110 performs a correlation operation between the obtained image signals A and B and computes the phase difference between the image signals A and B (or in other words, the amount of shift required to match the image signals). In step S407, the CPU 110 computes the precision of the phase difference computed in step S406, or in other words reliability. In step S408, the CPU 110 determines whether the detected phase difference is precise based on the reliability computed in step S407. If it is determined that the phase difference is precise, the phase difference computed in step S406 is used as the final focus detection result.

In step S409, if an instruction to end focus detection is detected, the CPU 110 ends the focus detection processing. If such an instruction is not detected, the CPU 110 returns the procedure to step S402 and repeats the above-described processing.

A specific example of the accumulation pixel selection processing performed in step S402 will be described next in detail with reference to the flowchart shown in FIG. 5.

In step S502, upon the initial charge accumulation after activation of the digital video camera 10 or when the accumulation pixels have been reset, the CPU 110 transitions the procedure to step S503 and selects pixels that are preset by default (SA5 to SA25 and SB5 to SB25 in this example).

If, on the other hand, the determination result is No in step S502, then, in step S504, the CPU 110 determines whether the current operation mode (image capturing mode) of the digital video camera 10 is included in a preset short distance mode. The short distance mode as used herein refers to a set of image capturing modes in which short distance focusing accuracy is often required such as, for example, a macro mode, a people capturing mode and a tracking mode (a mode that maintains a particular subject in focus) and can be set in advance. The image capturing modes included in the short distance mode may be changeable by the user.

If it is determined that the current image capturing mode is not included in the short distance mode, the CPU 110 transitions the procedure to step S505 and selects the same pixels as those selected in the previous time. If the default pixels were selected in the previous time, the default pixels are again selected. If, on the other hand, it is determined in step S504 that the current image capturing mode is included in the short distance mode, the CPU 110 transitions the procedure to step S506, and makes reference to, for example, the previous focus detection result stored in the RAM 112. Then, the CPU 110 determines whether the distance to the subject obtained by the previous focus detection result is less than a preset short distance threshold value (for example, less than 2 m). If it is determined that the distance to the subject detected in the previous time is equal to or greater than the short distance threshold value, the CPU 110 transitions the procedure to step S505 and selects the same pixels as those selected in the previous time.

If, on the other hand, it is determined in step S506 that the distance to the subject detected in the previous time is less than the short distance threshold value, the CPU 110 updates selection of accumulation pixels through processing of steps S507 and S508. First, in step S507, the CPU 110 selects pixels for acquiring the image signal A. An example of the selecting processing will be described with reference to FIGS. 6A to 6E. In the present embodiment, the image signal A is used as a reference signal. Accordingly, the CPU 110 selects pixels located in a range corresponding to the current field of view of the lens unit 100 from the line sensor 203A as the pixels for acquiring the image signal A.

As described above, the external AF sensor unit 130 is provided at a position different from that of the image sensor 109 to capture images that are to be recorded or displayed, and therefore their optical axes are different. For this reason, the image in the region on which the external AF sensor unit 130 performs focus detection is formed in a different position in the image sensor 109 due to the influence of parallax.

Figure 6A:
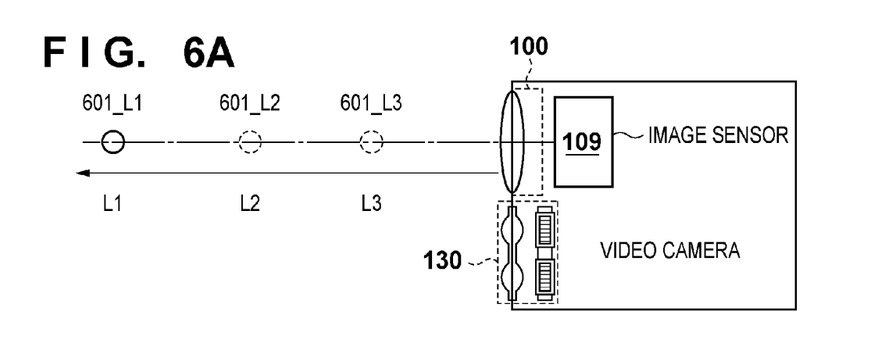
FIGS. 6A to 6E are diagrams illustrating details of processing for selecting pixels for acquiring an image signal A performed in step S507 of FIG. 5.

The magnitude of parallax is affected not only by the distance between optical axes but also by the distance to the subject. In this example, it is assumed that the external AF sensor unit 130 is installed directly beside the image sensor 109 as shown in FIG. 6A and that a round subject 601 is located at a position away from the image sensor 109 at a distance L1, L2 or L3 (where L1>L2>L3) on the optical axis of the lens unit 100.

Figure 6B:
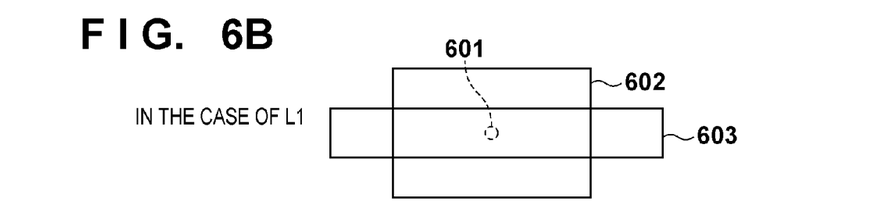
Figure 6C:
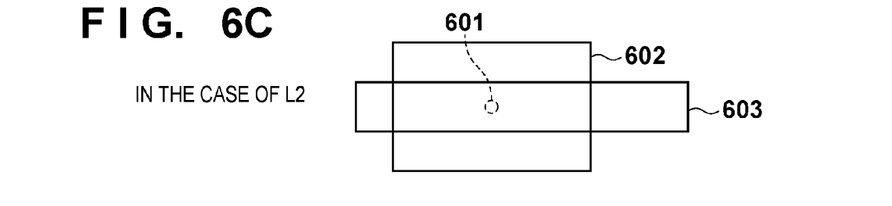
Figure 6D:
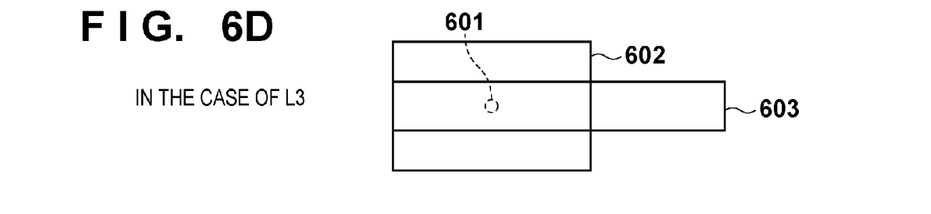
Figure 6E:
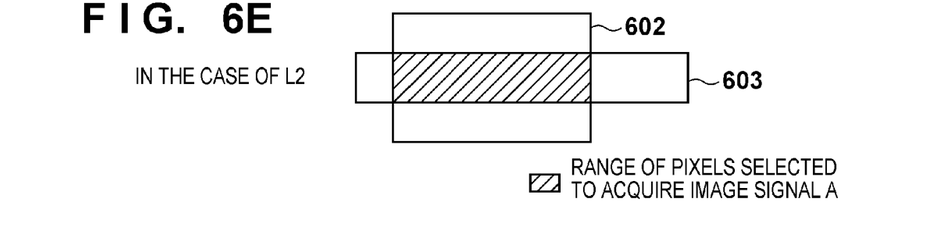

FIGS. 6B to 6D show fields of view 602 (the image capture area of the image sensor 109) of the lens unit 100 and fields of view 603 (the image capture area of the line sensor) of the image-forming lens 131 of the external AF sensor unit 130 in the case where the distance to the subject is L1, L2 and L3, respectively.

Because the subject 601 is located on the optical axis of the lens unit 100, the subject 601 is in the center of the field of view 602 of the lens unit 100 regardless of the distance to the subject. However, due to the influence of parallax, in the fields of view 603 of the image-forming lens 131 of the external AF sensor unit 130, the subject 601 is viewed at a position shifted slightly to the left from the center, and the amount of shift increases as the distance to the subject decreases.

As described above, with the external AF sensor unit 130, even if a subject is at the same position, the position in the line sensor at which the image of the subject is formed varies according to the distance to the subject. For this reason, the CPU 110 selects, in the line sensor 203A, pixels that are included in a region overlapping the image capture area of the lens unit 100 as the pixels for acquiring the image signal A. For example, in the case where the distance to the subject is L2, the CPU 110 selects, from among the pixels of the line sensor 203A, pixels that are in a region indicated by hatching in FIG. 6E as the pixels for acquiring the image signal A.

Information regarding the pixels to be selected according to the distance to the subject can be stored in the non-volatile memory 113 in the form of a table in which each distance to the subject is associated with pixels to be selected. In the case where the lens unit 100 is a zoom lens, it is sufficient that a table is prepared for each magnification power (angle of view) of the zoom lens. It is possible to use a configuration in which a table is provided for each distance to the subject or each discrete value of the angle of view, and other values are computed by an interpolation operation. In the case where the lens unit 100 is not a zoom lens, it is unnecessary to consider changes in the angle of view.

If the position of the focus detection region moves in the horizontal direction from the optical axis of the lens unit 100, the amount of shift of the position at which the subject is viewed further increases. For this reason, in the case where the focus detection region can be set to a position other than on the optical axis, the region of the selected pixels is corrected depending on the position of the focus detection region (the distance from the center).

Figure 5:
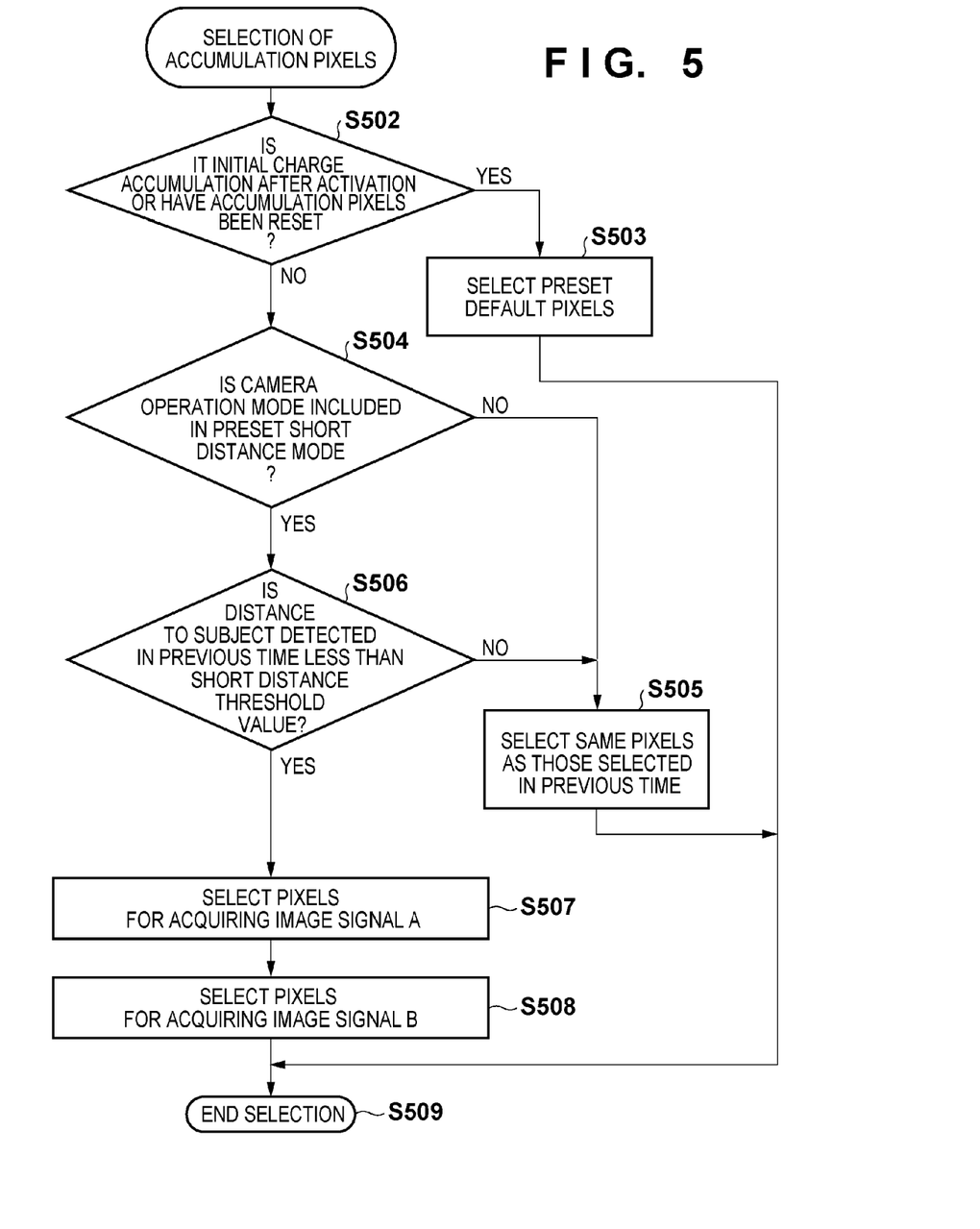
FIG. 5 is a flowchart illustrating details of processing for selecting accumulation pixels performed in step S402 of FIG. 4.

Reverting to FIG. 5, when the CPU 110 has selected pixels for acquiring the image signal A in step S507, in the next step S508, the CPU 110 selects pixels for acquiring the image signal B. This selecting operation will be described with reference to FIGS. 7A to 7D.

Figure 7A:
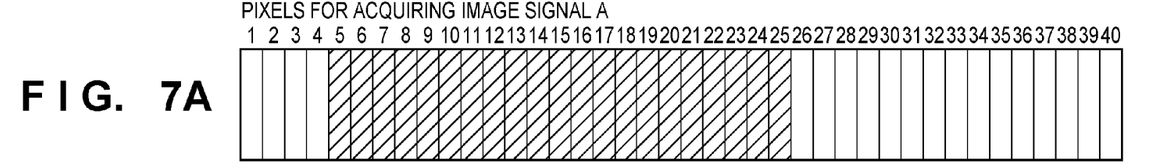
FIGS. 7A to 7D are diagrams illustrating details of processing for selecting pixels for acquiring an image signal B performed in step S508 of FIG. 5 according to a first embodiment of the present invention.
Figure 7B:
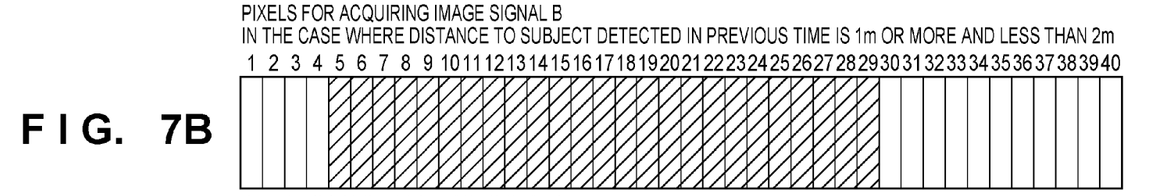

In step S508, the CPU 110 selects pixels for acquiring the image signal B from among the pixels of the line sensor 203B according to the distance to the subject detected in the previous time that was acquired in step S506. It is assumed, for example, that pixels SA5 to SA25 have been selected in step S507 as the pixels for acquiring the image signal A, as shown in FIG. 7A. In this case, if the distance to the subject detected in the previous time is 1 m or more and less than 2 m, the CPU 110 selects pixels (SB5 to SB25) that are the same in number as the pixels for acquiring the image signal A and that are located at positions corresponding to those of the pixels for acquiring the image signal A as well as a predetermined number of pixels that are adjacent to those pixels, as the pixels for acquiring the image signal B (FIG. 7B). In this example, pixels SB5 to SB25 and a predetermined number of pixels (four pixels in this example) adjacent to the pixel (SB25) that corresponds to the right end pixel of the pixels for acquiring the image signal A are selected as the pixels for acquiring the image signal B. In other words, the CPU 110 selects, as the pixels for acquiring the image signal B, pixels SB5 to SB29 that are in a range extended to the right from the range of the pixels for acquiring the image signal A.

Figure 7C:
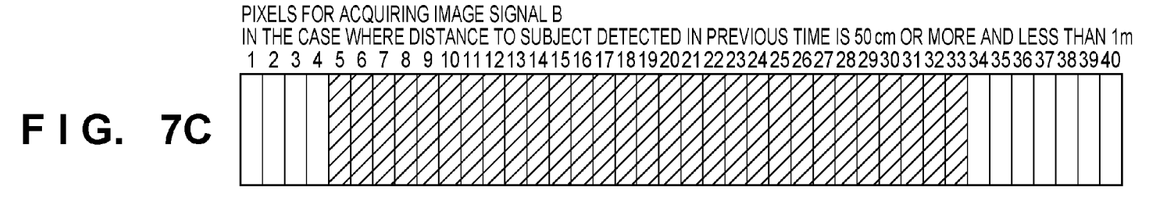
Figure 7D:
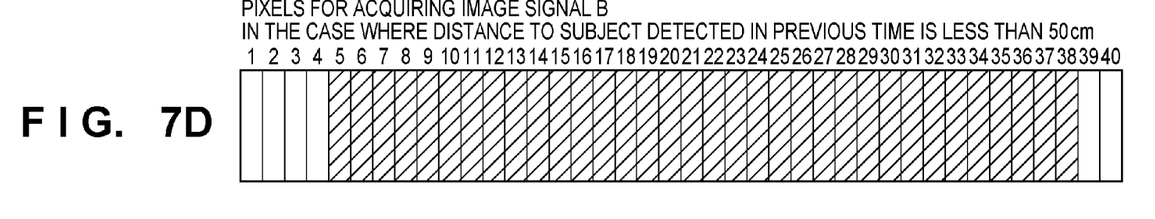

Also, the CPU 110 selects, as the pixels for acquiring the image signal B, pixels SB5 to SB33 if the distance to the subject detected in the previous time is 50 cm or more and less than 1 m, and selects pixels SB5 to SB38 if the distance to the subject detected in the previous time is less than 50 cm. In other words, the CPU 110 increases the number of additional pixels that are selected in addition to those pixels that are the same in number as the pixels for acquiring the image signal A and that are located at positions corresponding to those of the pixels for acquiring the image signal A as the distance to the subject detected in the previous time becomes shorter. This is based on the principle that the shorter the distance to the subject, the larger the phase difference becomes because the image signal A is a reference image signal whereas the image signal B is an image signal for detecting a phase difference with respect to the image signal A. In other words, the number of pixels for acquiring the image signal B is increased as the distance to the subject becomes shorter in order to obtain good focus detection accuracy (phase-difference detection accuracy) even in situations where the phase difference between the image signals A and B is large. It is thereby possible to broaden the overlapping range of the image signals A and B in the case where the distance to the subject is short (the number of pixels for acquiring the image signal B can be increased in which the same optical image of the field of view as that formed on the pixels for acquiring the image signal A is formed). As a result, with the image signals A and B, the signal range that can be used for phase difference detection can be broadened, whereby the phase-difference detection accuracy (or in other words, focus detection accuracy) can be improved. In the case where the distance to the subject is not short, the phase difference between the image signals A and B is not large, and thus the number of pixels for acquiring the image signal B is reduced as compared to the case where the distance to the subject is short. It is thereby possible to reduce unnecessary operations.

In the example described above, in step S506, whether or not the distance to the subject is less than the short distance threshold value is determined based on the distance to the subject detected by the external AF sensor unit 130 in the previous time. However, it is also possible to use a configuration in which focus detection is performed using a contrast AF method based on an image captured at a position at which the focus lens focuses on a subject located in a distance less than the short distance threshold value, and if the AF evaluation value is higher than a predetermined threshold value, it is determined that the distance to the subject is less than the short distance threshold value.

Also, in step S504, whether to change selection of accumulation pixels is determined according to the operation mode of the camera, but it may be determined based on other conditions. For example, if it is determined that the distance to a subject serving as a focus detection target is continuously increasing or decreasing based on temporal changes in the images sequentially captured by the image sensor 109 or the focus detection results in the past, selection of accumulation pixels may be changed.

Alternatively, a configuration may be used in which step S504 is omitted and selection of accumulation pixels is performed if the distance to the subject is less than the short distance threshold value.

Second Embodiment

A second embodiment of the present invention will be described next. The present embodiment is the same as the first embodiment except for the processing for selecting pixels for acquiring the image signal B performed in step S508 of FIG. 5. Accordingly, only processing of step S508 that is characteristic of the present embodiment will be described.

The present embodiment is the same as the first embodiment in that pixels for acquiring the image signal B are selected from among the pixels of the line sensor 203B according to the distance to the subject detected in the previous time. However, unlike the first embodiment in which the number of pixels for acquiring the image signal B is increased according to the distance to the subject, in the present embodiment, the CPU 110 shifts a selection range of pixels for acquiring the image signal B according to the distance to the subject.

Figure 8A:
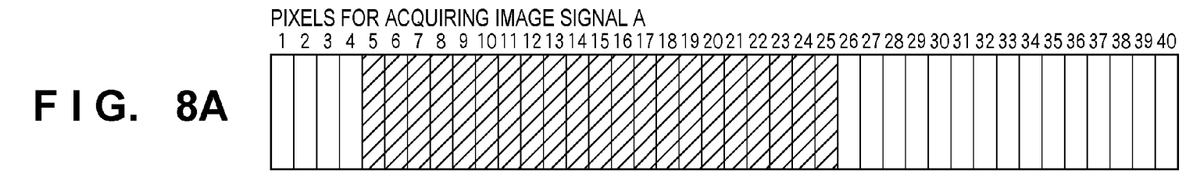
FIGS. 8A to 8D are diagrams illustrating details of processing for selecting pixels for acquiring an image signal B performed in step S508 of FIG. 5 according to a second embodiment of the present invention.

For example, as in the first embodiment, it is assumed that pixels SA5 to SA25 have been selected in step S507 as the pixels for acquiring the image signal A as shown in FIG. 8A.

Figure 8B:
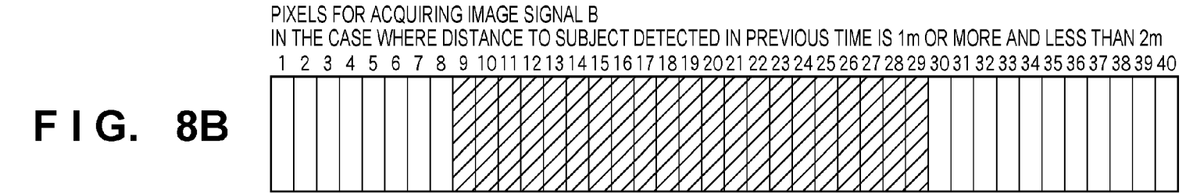

If the distance to the subject detected in the previous time is 1 m or more and less than 2 m, the CPU 110 selects pixels that are the same in number as the pixels for acquiring the image signal A and that are located at positions shifted to the right by a predetermined number of pixels (by four pixels in this example) from the positions of the pixels for acquiring the image signal A, as the pixels for acquiring the image signal B (FIG. 8B). Specifically, the CPU 110 selects pixels that are in a range obtained by shifting to the right by four pixels from the positions (SB5 to SB25) corresponding to the pixels SA5 to SA25, namely, pixels SB9 to SB29, as the pixels for acquiring the image signal B.

Figure 8C:
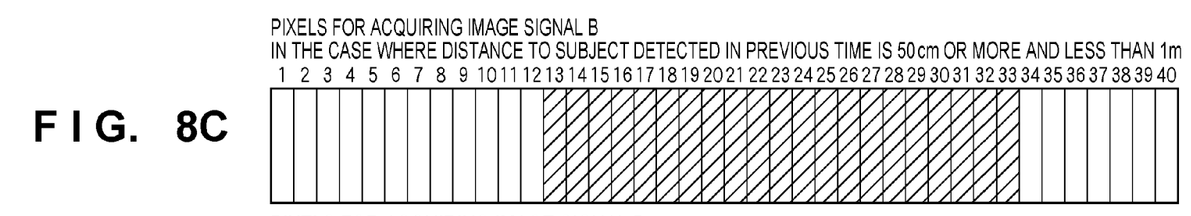
Figure 8D:
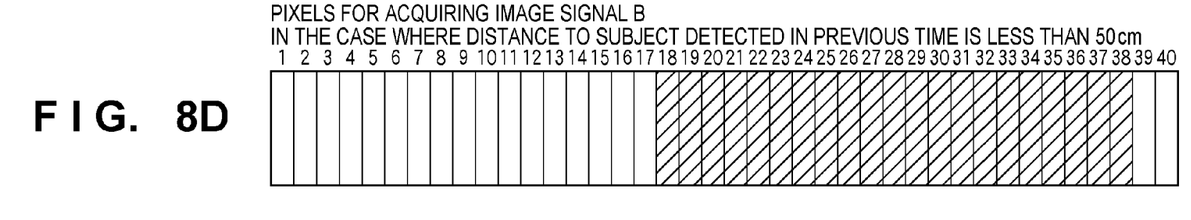

Likewise, the CPU 110 selects, as the pixels for acquiring the image signal B, pixels SB13 to SB33 if the distance to the subject detected in the previous time is 50 cm or more and less than 1 m, and selects pixels SB18 to SB38 if the distance to the subject detected in the previous time is less than 50 cm (FIGS. 8C and 8D). In this manner, the CPU 110 shifts the range of pixels for acquiring the image signal B by a larger amount as the distance to the subject detected in the previous time becomes shorter.

In consideration of the fact that the phase difference between the image signals A and B is large in the case where the distance to the subject is short, in the first embodiment, the number of pixels for acquiring the image signal B is increased (the range is extended) so that the number of pixels on which the same optical image of the field of view as that formed on the pixels for acquiring the image signal A is formed is increased. According to the present embodiment, instead of increasing the number of pixels for acquiring the image signal B (instead of extending the range of pixels for acquiring the image signal B), the range of pixels for acquiring the image signal B is shifted by a predetermined number of pixels so that the range on which the same optical image of the field of view as that formed on the pixels for acquiring the image signal A is formed is enlarged. Therefore, the present embodiment can reduce the amount of operation required to perform phase-difference detection particularly in the case where the distance to the subject is short, in addition to the effects obtained by the first embodiment.

If the subject in a short distance is no longer present and the distance to the subject becomes long (infinite, for example), the phase difference between the image signals A and B will decrease rapidly, and the degree of matching between the image signals A and B becomes very high. Accordingly, focus detection of the infinity distance is possible even with pixels that were not selected, and the accuracy of focus detection of the subject in a long distance can be maintained even using non-selected pixels.

Other Embodiments

In the first and second embodiments, in which direction of the line sensor the range of pixels for acquiring the image signal B is to be extended or shifted may be determined depending on the direction of the shift due to parallax in the position at which a subject is viewed between the lens unit 100 and the external AF sensor unit 130. Also, the amount by which the range is extended or shifted can be set such that the shorter the distance to the subject, the larger the amount. In the above examples, the range is extended or shifted by four pixels in FIGS. 7B to 7C and FIGS. 8B to 8C, whereas the range is extended or shifted by five pixels in FIGS. 7C to 7D and FIGS. 8C to 8D.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281006, filed on Dec. 16, 2010, which is hereby incorporated by reference herein its entirety.

What is claimed is:

1. A focus detecting apparatus including an optical system for focus detection arranged such that an optical axis thereof does not overlap with an optical axis of an optical system for imaging, the focus detecting apparatus comprising:
   a pair of line sensors that includes a plurality of pixels and that is for performing photoelectric conversion on a pair of optical images of a field of view formed by a pair of image-forming lenses of the optical system for focus detection, the image-forming lenses having parallel optical axes;
   a selection unit that selects, with respect to each of the pair of line sensors, a plurality of pixels for use in the photoelectric conversion of the optical images of a field of view; and
   a detecting unit that detects a distance to a subject on which focus detection is to be performed, based on a phase difference between signals of the pair of optical images of a field of view that have undergone photoelectric conversion performed by the plurality of pixels selected by the selection unit,
   wherein in a case where a distance to the subject detected by the detecting unit in a previous time is less than a predetermined threshold value,
   the selection unit selects, with respect to one of the pair of line sensors, a plurality of pixels that are included in a range in which an image capture area of the optical system for imaging and an image capture area of the optical system for focus detection overlap, and selects, with respect to the other line sensor, a plurality of pixels such that more pixels are included on which the same optical image of a field of view as that formed on the plurality of pixels that have been selected in the one line sensor is formed than in a case where pixels located at positions corresponding to those of the plurality of pixels that have been selected in the one line sensor are selected.

2. The focus detecting apparatus according to claim 1, wherein in the case where the distance to the subject detected in the previous time is less than the predetermined threshold value, the selection unit selects, in the other line sensor, a plurality of pixels that are the same in number as the pixels that have been selected in the one line sensor and that are located at positions corresponding to those of the pixels that have been selected in the one line sensor and a predetermined number of pixels adjacent to the plurality of pixels.

3. The focus detecting apparatus according to claim 1, wherein in the case where the distance to the subject detected in the previous time is less than the predetermined threshold value, the selection unit selects, in the other line sensor, pixels that the same in number as the pixels that have been selected in the one line sensor and that are located in positions shifted from positions of the pixels that have been selected in the one line sensor by a predetermined number of pixels.

4. The focus detecting apparatus according to claim 1, wherein the focus detecting apparatus is provided in an image capturing apparatus that includes the optical system for imaging, and
   the selection unit selects the same pixels as pixels selected in the previous time in a case where an operation mode of the image capturing apparatus is not a preset operation mode and in a case where the distance to the subject detected by the detecting unit in the previous time is not less than the predetermined threshold value.

5. The focus detecting apparatus according to claim 1, wherein the focus detecting apparatus is provided in an image capturing apparatus that includes the optical system for imaging,
   the image capturing apparatus includes a focus detecting unit that performs focus detection on the subject by driving a focusing lens of the optical system for imaging based on contrast of an optical image of a field of view that is captured by an image sensor of the image capturing apparatus and formed by the optical system for imaging, and
   in a case where it is determined, based on a result of the focus detection on the subject performed by the focus detecting unit, that the distance to the subject is less than the predetermined threshold value, the selection unit performs selection of pixels as in the case where the distance to the subject detected by the detecting unit in the previous time is less than the predetermined threshold value.

6. A control method of a focus detecting apparatus including an optical system for focus detection arranged such that an optical axis thereof does not overlap with an optical axis of an optical system for imaging, the method comprising the steps of:
   selecting, with respect to each of a pair of line sensors that includes a plurality of pixels and that is for performing photoelectric conversion on a pair of optical images of a field of view formed by a pair of image-forming lenses of the optical system for focus detection, the image-forming lenses having parallel optical axes, a plurality of pixels for use in the photoelectric conversion of the optical images of a field of view; and
   detecting a distance to a subject on which focus detection is to be performed, based on a phase difference between signals of the pair of optical images of a field of view that have undergone photoelectric conversion performed by the plurality of pixels selected in the selection step, wherein in the selection step, in a case where a distance to the subject detected in the detecting step in a previous time is less than a predetermined threshold value, with respect to one of the pair of line sensors, a plurality of pixels that are included in a range in which an image capture area of the optical system for imaging and an image capture area of the optical system for focus detection overlap are selected, and with respect to the other line sensor, a plurality of pixels are selected such that more pixels are included on which the same optical image of a field of view as that formed on the plurality of pixels that have been selected in the one line sensor is formed than in a case where pixels located at positions corresponding to those of the plurality of pixels that have been selected in the one line sensor are selected.

* * * * *